(12) United States Patent  
McLarty, III

(10) Patent No.: US 7,046,898 B2
(45) Date of Patent: May 16, 2006

(54) CONDUIT INSERT FOR OPTICAL FIBER CABLE

(75) Inventor: George C. McLarty, III, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/680,827

(22) Filed: Oct. 7, 2003

(65) Prior Publication Data

US 2005/0074218 A1    Apr. 7, 2005

(51) Int. Cl.
    G02B 6/00    (2006.01)
(52) U.S. Cl. ..................................... 385/134
(58) Field of Classification Search ............... 385/100, 385/134, 105–106, 110, 112; 174/97–98, 174/99 R, 19
    See application file for complete search history.

(56) References Cited

U.S. PATENT DOCUMENTS

| 4,585,034 A | 4/1986 | Hubbard et al. ............ 138/111 |
| 4,729,409 A | 3/1988 | Paul ............................ 138/115 |
| 4,741,593 A | 5/1988 | Fochler ...................... 350/96.23 |
| 5,069,254 A | 12/1991 | Vogelsang .................. 138/111 |
| 5,236,016 A | 8/1993 | Vogelsang .................. 138/115 |
| 5,587,115 A | 12/1996 | Allen .......................... 264/1.24 |
| 5,792,991 A | 8/1998 | Nolf ............................ 174/92 |
| 5,922,995 A | 7/1999 | Allen .......................... 174/95 |
| 6,246,820 B1 | 6/2001 | Le Cam et al. .............. 385/100 |
| 6,564,831 B1 | 5/2003 | Sanoner et al. ............. 138/115 |
| 6,671,440 B1 * | 12/2003 | Morris ........................ 385/100 |

* cited by examiner

Primary Examiner—Javaid H. Nasri
(74) Attorney, Agent, or Firm—Terry T. Moyer; Charlotte C. Wilson

(57) ABSTRACT

A flexible innerduct structure configured to divide a cable conduit, as well as methods for inserting the innerduct structure and the cable into a conduit. The innerduct structure includes a flat, flexible strip-shaped material having a width at least slightly greater than the diameter of the conduit into which the innerduct structure is installed. Other principal features relate to the material of which the innerduct structure is formed. Such features include the structure of the material, such as a woven structure, and further include properties such as melting point, tensile strength, elongation, coefficient of friction and rigidity.

17 Claims, 3 Drawing Sheets

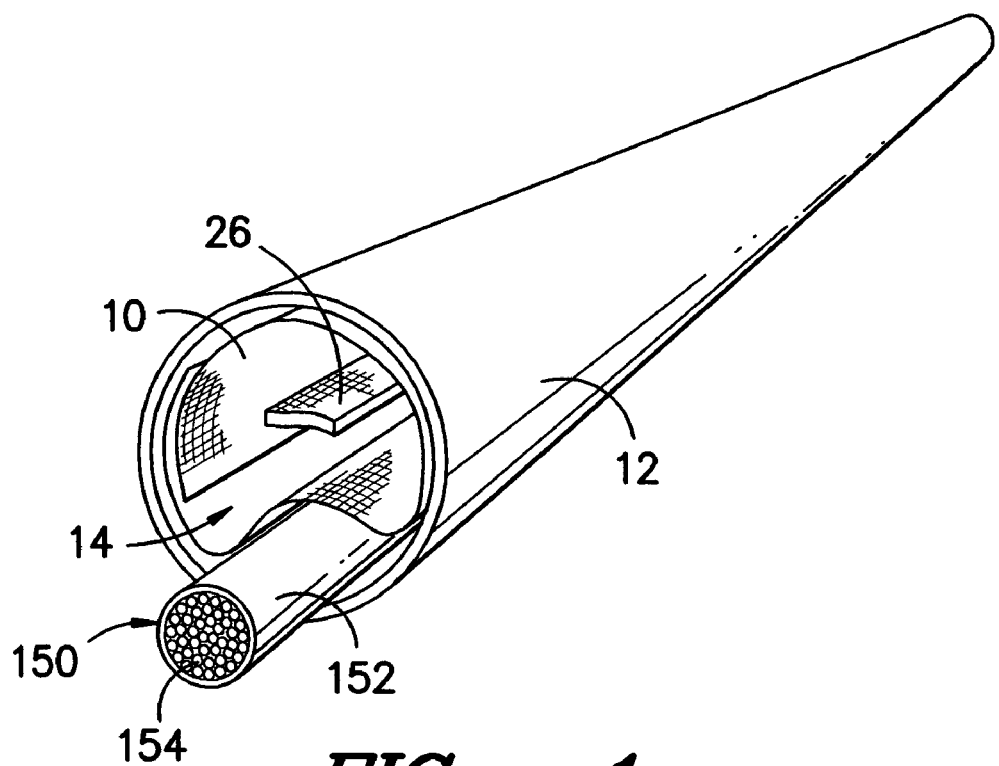
FIG. -1-
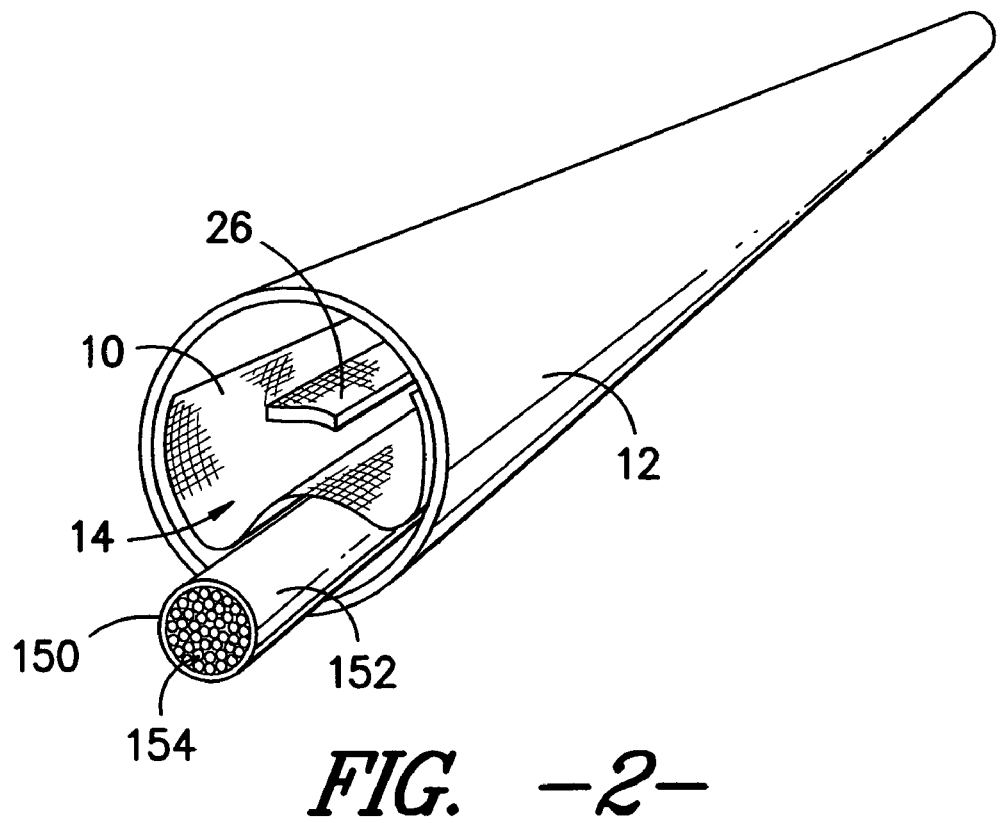
FIG. -2-

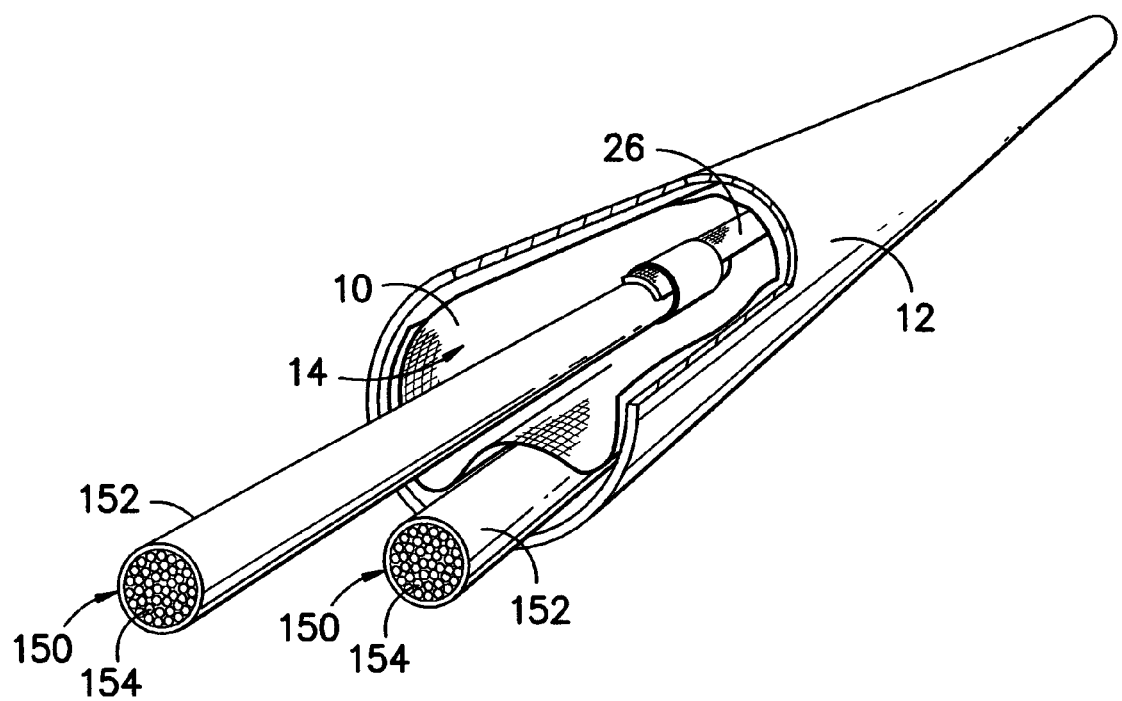
FIG. -3-
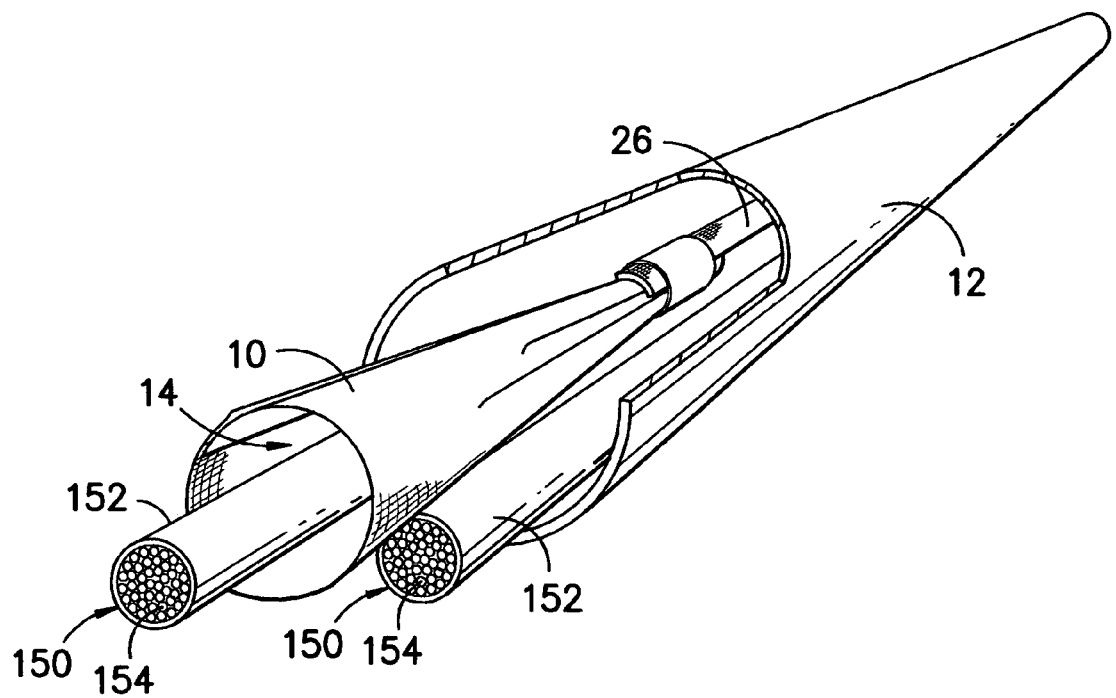
FIG. -4-

FIG. -5-

CONDUIT INSERT FOR OPTICAL FIBER CABLE

BACKGROUND OF THE INVENTION

The present invention generally relates to tubular conduit of the type that might be employed for the housing of cables, such as fiber optic cable, coaxial cable, or the like. The tubular conduit may be disposed underground or within buildings, above ground, or aerially, across bridges for instance. More particularly, the present invention relates to a partitioning device, which may be inserted into such a conduit such that the conduit is divided into separate areas, as well as a method for installing and using such a device. Specifically, the present invention is directed toward an elongated partitioning device which is flexible, such that it may be inserted into a conduit which is already in place, which may already have at least one cable positioned therein, and which may have turns, bends, or the like therein.

Cable, such as fiber optic communication cable, is often provided underground in great lengths, and may even extend for many miles. It is known in the art to bury the cable in the ground so that the area above ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable in the ground. The conduit is often formed from lengths of polyvinyl chloride tubing, steel, plastic or the like, which is generally laid in the ground. A rope is then blown through the conduit, and the rope in turn is attached to one of the communication cables. By pulling the rope, the cable is drawn through the conduit. Once in place within the conduit, the cable is protected from damage that may be caused by weather, water and the like.

It has been found that certain rodents will sometimes gnaw through an underground conduit. Hence, much underground conduit is employed which has a diameter of two inches or more, which is large enough to impede damage from most rodents. While such conduit provides excellent protection for communication cable, there is also much unused or "dead" space within such a conduit. With the advent of fiber optic cables, which may be only a half-inch or less in diameter, there is even more dead space within an average conduit.

When a conduit is in place, it may be subsequently desired to run a second communications cable at the same location. As such, it would be desirable from a cost and time standpoint to make use of the dead space within an existing conduit, rather than laying a new length of conduit. However, it has been found that it is difficult to merely insert a second cable into a conduit that already contains a first cable. When a rope is blown into a conduit already containing a cable, or a second cable is "snaked" through the conduit, they are often impeded by the first cable, making it impossible to insert the second cable.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists therefore for a device to separate or partition a conduit, such as an underground communication cable conduit, into discrete sections. The device must be capable of being inserted into a conduit that is already in place, which may undulate over many miles, and which may have sharp turns therein. A need also exists for a partitioning device that will provide for improved use of the space within a conduit.

SUMMARY OF THE INVENTION

The present invention comprises a flexible innerduct structure configured to divide a cable conduit, as well as methods for inserting the innerduct structure and the cable into a conduit. The innerduct structure of the present invention includes a flat, flexible strip-shaped material having a width at least slightly greater than the diameter of the conduit into which the innerduct structure is being positioned. Other principal features of the invention relate to the material of which the innerduct structure is formed. Such features include the structure of the material, such as a woven structure, and further include properties such as melting point, tensile strength, elongation, coefficient of friction and rigidity.

BRIEF DESCRIPTION OF THE DRAWINGS

The invention shall become apparent from the description which follows, in view of the drawings in which:

FIG. 1 is a perspective view of a first embodiment of the innerduct structure positioned within a conduit;

FIG. 2 is a perspective view of a second embodiment of the innerduct structure positioned within a conduit;

FIG. 3 is a perspective cutaway view of an embodiment of the innerduct structure positioned within a conduit, while a second cable is being pulled therethrough;

FIG. 4 is a perspective cutaway view of an embodiment of the innerduct structure being pulled into a conduit simultaneously with a second cable member; and FIG. 5 is a transverse cross-sectional view of one embodiment of the innerduct structure, wherein the edges are folded over and sewn along each longitudinal side thereof.

DESCRIPTION OF PREFERRED EMBODIMENTS

Referring now to the drawings, the reference number 10 represents an insert, which may be referred to as an innerduct, to be inserted in an optical fiber cable conduit 12. As shown in FIGS. 1 and 2, a single innerduct structure 10 is shown in a conduit 12, but it should be understood that multiple innerducts like the innerduct 10 can be inserted in a conduit 12 depending on the number of cables to be installed into the conduit 12. In a preferred embodiment, the innerduct structure is a flat, semi-rigid, strip-shaped piece of low-friction material that is stored on a roll. As the innerduct is fed or pulled into the conduit, the innerduct bends in the transverse direction, conforming somewhat to the shape of the inner walls of the conduit, to form a divider within the conduit. It is contemplated that the width may vary from slightly wider than the diameter of the conduit, as shown in FIG. 2, to several times the diameter of the tube to form a complete, unconnected tube, as shown in FIG. 1.

The fabric material preferably is semi-rigid and pliable, allowing the innerduct 10 to be pulled through the conduit 12 without snagging or generating too much heat and also is diverse enough so that the cables separated by the innerduct do not interfere with each other. To this end, the innerduct structure 10 in the first embodiment is made from 100% plain woven nylon fabrics having a 520 denier monofilament in both the warp and fill direction woven with a pick and end count of 38.5 which, when finished, has a 40×40 pick and end count. The fabric has a weight of 6.0 oz. yd. It is understood that the monofilament denier can vary from 200–1000 denier and the pick and end could well be altered to provide the desired cover to prevent contact of the fiber optic cables. The innerduct 10 is manufactured in long lengths for insertion in previously installed conduits 12. As stated above, the preferred yarn is 520 denier nylon 6 monofilament but another yarn, such as a 520 denier polyester, can be used so long as it has the desired characteristics. In one preferred embodiment, polyester yarn is used in the warp direction, and nylon yarn is used in the fill direction.

The innerduct 10 is manufactured in long lengths for insertion in previously installed conduits 12. Pull lines 26, which are preferably woven plastic tapes or plastic ropes, are tied to the optical fiber cables at one end and are pulled through the channels 14 by grasping and pulling the lines 26 at the other end, as shown in FIGS. 3 and 4. The above described innerduct 10 is readily manufactured and provides a structure which allows optical fiber cables, coaxial cables, and the like to be pulled through without snagging or excessive heat build-up due to friction, and does not allow contact or alternation losses between adjacent fiber optic cables in other channels of the insert. In a preferred embodiment, the longitudinal edges of the innerduct structure are sealed in some manner, to prevent fraying, which could cause many problems during the installation of the innerduct structure 10 itself, or during the installation of cable members 150. The longitudinal edges may be sealed in any suitable manner, including heat-sealing the edges, ultrasonically sealing the edges, folding the edges over and sewing as shown in FIG. 5, or gluing and score cutting the edges.

FIG. 3 shows an optical fiber cable 150 being installed in an innerduct constructed in accordance with one aspect of the invention. In one embodiment, the installation method comprises the steps of inserting a first cable into a conduit, then inserting the innerduct structure 10 together with pulling means 26 such as a pull rope or tape, followed by pulling a second cable 150 into the second channel using the pulling means.

In a second aspect of the present invention, the installation method comprises the steps of inserting a first cable into a conduit, then simultaneously pulling the innerduct structure 10 together with the cable member 150 into the conduit 12 by using the pulling means 26. This installation method is illustrated in FIG. 4. Alternatively, the innerduct structure may be inserted into an empty conduit, together with a pulling tape or rope on either side of the innerduct structure. Then, after installation of the innerduct structure, a single cable or multiple cables may be pulled through the conduit using the pulling means.

The cable 150 includes a plastic sheath 152 containing a bundle of optical fibers 154. Preferably, the innerduct 10 that receives the cable 150 is formed of a flexible material that is specified with reference to the plastic sheath 152 so as to have a melting temperature not lower than, and most preferably higher than, the melting temperature of the plastic sheathing material. This helps to ensure that sliding friction will not cause the cable 150 to burn through the innerduct when the cable 150 is being pulled longitudinally through or adjacent the innerduct. In accordance with this feature of the invention, the innerduct structure may be formed of nylon 6 so as to have a melting temperature of about 220 degrees C.

The resistance to cable burn-through can also be specified with reference to a pull line duct cutting test substantially similar to the test known as the Bellcore pull line duct cutting test. In accordance with this feature of the invention, the innerduct material is preferably specified such that a 0.25 diameter polypropylene rope will not burn through a test sample of the innerduct structure when pulled through the test sample at 100 feet per minute and 450 pounds tension for at least 90 seconds.

The innerduct material may further be specified with reference to the material of which the pull lines are formed. In accordance with this feature of the invention, the innerduct material and the pull line material preferably have respective values of elongation percentage that are substantially equal for a given tensile load. If elongation of the innerduct differs substantially from that of a pull line, one of those structures may lag relative to the other when they are pulled together through a conduit in which they are to be installed together. The elongation percentages of the layer material and the pull line material are preferably not greater than about 75 percent at a peak tensile load, i.e., just prior to tensile failure, and are preferably within the range of about 15 to about 60 percent. A more preferred range extends from about 25 to about 40 percent. For example, nylon 6 is a preferred material and has an elongation of about 40 percent at a peak tensile load. Polyester is another preferred material and has an elongation of about 25 percent at a peak tensile load.

The innerduct layer material should be rigid enough to resist collapsing upon itself or bunching up under the influence of the pull lines and cables, but also should be flexible enough to be pulled easily through turns and undulation in the duct in which it is installed.

The coefficient of friction also can be specified for the innerduct structure material in accordance with the invention. In accordance with this feature of the invention, the innerduct material preferably has a dry static coefficient of friction, based on high density polyethylene on the material with a longitudinal line of action, within the range of about 0.010 to about 0.500. This range is more preferably from about 0.025 to about 0.250, and is preferably from about 0.035 to about 0.100. For example, a woven innerduct layer having polyester warp yarns and nylon 6 fill yarns was found to have a dry static coefficient of friction, based on high density polyethylene on the material with a longitudinal line of action, of 0.064. A similar material having heat set polyester warp yarns had a corresponding coefficient of friction of 0.073. A material having heat set polyester yarns in both the warp and fill directions had a corresponding coefficient of friction of 0.090, and a material having nylon 6 greige yarn in both the warp and fill directions had a corresponding coefficient of friction of 0.067. These coefficients of friction differed for transversely directed lines of action on the four foregoing materials and were, respectively, 0.085, 0.088, 0.110, and 0.110. The dynamic or sliding coefficients of friction for these materials, again based on high density polyethylene on the material with a longitudinal line of action, were found to be 0.063, 0.56, 0.058, and 0.049, respectively. The transverse counterparts to these dynamic values were 0.064, 0.067, 0.078, and 0.075, respectively. Although these tested values of sliding coefficient of friction are most preferred, the invention comprises broader ranges such as the range from about 0.0050 to about 0.1250, as well as an intermediate range of about 0.0075 to about 0.0625, and a narrower range of about 0.0100 to about 0.0250.

Other features of the invention relate to the tensile strength of the innerduct material. In an innerduct constructed in accordance with the invention, the structure preferably has a longitudinal tensile strength of at least about 12.5 pounds per inch of width. The longitudinal tensile strength of the structure may be within the range of about 12.5 to about 300 pounds per inch of width, and more preferably is within the range of about 50 to about 250 pounds per inch of width. However, the longitudinal tensile strength of the structure is most preferably within the range of about 100 to about 200 pounds per inch of width. For example, the innerduct structure may be formed of a woven fabric having both warp and fill yarns formed of nylon 6, with a longitudinal tensile strength of about 150 pounds per inch of width.

The invention has been described with reference to preferred embodiments. Those skilled in the art will perceive improvements, changes and modifications. Such improvements, changes and modifications are intended to be within the scope of the claims.

What is claimed is:

1. A cable assembly comprising:
   at feast one cable member disposed within a conduit; and
   an innerduct structure for dividing said conduit into compartments, said innerduct structure consisting essentially of a generally flat strip of flexible textile material disposed within said conduit adjacent said cable member, wherein said innerduct structure is at least as wide as the diameter of said conduit such that at least one edge of said flexible textile strip conforms to the interior of said conduit.

2. The cable assembly set forth in claim 1, wherein said textile material is a woven fabric.

3. The cable assembly set forth in claim 2, wherein said woven fabric is formed from monofilament yarns in the warp and fill directions.

4. The cable assembly set forth in claim 3, wherein said monofilament yarns have a denier in the range of 200–1000 denier.

5. The cable assembly set forth in claim 4, wherein said warp yarns are made from polyester, and said fill yarns are made from nylon.

6. The cable assembly set forth in claim 1, wherein said flexible material has a melting temperature of at least about 220 degrees C.

7. The cable assembly set forth in claim 1, wherein said cable includes an outer sheath that has a first melting temperature, and wherein said flexible material has a second melting temperature not lower than said first melting temperature.

8. The cable assembly set forth in claim 1, wherein said flexible material exhibits a longitudinal tensile strength of at least about 12.5 pounds per inch of width.

9. The cable assembly set forth in claim 1, wherein said flexible material has a longitudinal tensile strength within the range of about 12.5 pounds per inch of width to about 300 pounds per inch of width.

10. The cable assembly set forth in claim 1, wherein said flexible material exhibits an elongation percentage of not greater than about 75 percent at a peak tensile load.

11. The cable assembly set forth in claim 1, wherein said flexible material exhibits an elongation percentage of not greater than about 40 percent at a peak tensile load.

12. The cable assembly set forth in claim 1, wherein said flexible material exhibits an elongation percentage of not greater than about 25 percent at a peak tensile load.

13. The cable assembly set forth in claim 1, wherein said flexible material has a coefficient of friction, based on high density polyethylene on said material with a longitudinal line of action, below about 0.1250.

14. The cable assembly set forth in claim 1, wherein said flexible material is selected so that a 0.25 inch diameter polypropylene rope will not burn through a test sample of said structure when pulled through said test sample in a pull line duct cutting test at 100 feet per minute and 450 pounds tension for at least 90 seconds.

15. The cable assembly set forth in claim 1, wherein said flexible material is a fabric having warp and fill yarns formed of polyester.

16. The cable assembly set forth in claim 1, further comprising pulling means disposed within said conduit adjacent said innerduct structure.

17. The cable assembly set forth in claim 16, wherein said pulling means is selected from the group consisting of pulling tape and rope.

* * * * *

UNITED STATES PATENT AND TRADEMARK OFFICE
CERTIFICATE OF CORRECTION

PATENT NO. : 7,046,898 B2  Page 1 of 1
APPLICATION NO. : 10/680827
DATED : May 16, 2006
INVENTOR(S) : George C. McLarty, III It is certified that error appears in the above-identified patent and that said Letters Patent is hereby corrected as shown below:

Col. 5, Claim 1 line 20 "feast" should read "least"

Signed and Sealed this

Twenty-second Day of August, 2006

JON W. DUDAS
*Director of the United States Patent and Trademark Office*